United States Patent
Segar et al.

[11] Patent Number: 6,052,260
[45] Date of Patent: Apr. 18, 2000

[54] HEAD SUSPENSION MOUNTING SYSTEM WITH POSITIVE ORTHOGONAL ALIGNMENT FEATURES

[75] Inventors: Peter Raymond Segar, Burnsville; Zine-Eddine Boutaghou, Vadnais Heights, both of Minn.

[73] Assignee: Seagate Technology, Inc., Scotts Valley, Calif.

[21] Appl. No.: 09/100,676

[22] Filed: Jun. 19, 1998

Related U.S. Application Data

[60] Provisional application No. 60/050,351, Jun. 20, 1997, abandoned.

[51] Int. Cl.[7] .................................................. G11B 5/50
[52] U.S. Cl. ............................................................ 360/104
[58] Field of Search ............................................. 360/104

[56] References Cited

U.S. PATENT DOCUMENTS

| | | | |
|---|---|---|---|
| 4,912,583 | 3/1990 | Hinlein | 360/104 |
| 4,943,875 | 7/1990 | Reidenbach et al. | 360/104 |
| 4,947,275 | 8/1990 | Hinlein | 360/104 |
| 5,003,420 | 3/1991 | Hinlein | 360/104 |
| 5,313,355 | 5/1994 | Hagen | 360/104 |
| 5,495,375 | 2/1996 | Baasch et al. | 360/104 |
| 5,497,282 | 3/1996 | Hoffmann et al. | 360/104 |

FOREIGN PATENT DOCUMENTS

| | | |
|---|---|---|
| 5-307842 | 11/1993 | Japan . |

*Primary Examiner*—Craig A. Renner
*Attorney, Agent, or Firm*—Edward P. Heller, III; Raghunath S. Minisandram

[57] ABSTRACT

A mounting system attaches head suspensions to actuator head mounting arms of a disc drive actuator. The mounting system includes head suspension mounting plates and features on both the head suspension mounting plates and on the actuator head mounting arms that facilitate snap-fitting or press-fitting of the mating components, as well as features that ensure both accurate alignment and maintenance of the position of the mounted head suspensions in and about the major orthogonal axes.

3 Claims, 7 Drawing Sheets

HEAD SUSPENSION MOUNTING SYSTEM WITH POSITIVE ORTHOGONAL ALIGNMENT FEATURES

CROSS REFERENCE TO RELATED APPLICATIONS

This application claims the benefit of U.S. Provisional Application No. 60/050,351, filed Jun. 20, 1997 abandoned.

FIELD OF THE INVENTION

This invention relates generally to the field of hard disc drive data storage devices, and more particularly, but not by way of limitation, to an improved mounting system for attaching the head suspensions that support the read/write heads to the head mounting arms of the disc drive actuator.

BACKGROUND OF THE INVENTION

Disc drives of the type known as "Winchester" disc drives or hard disc drives are well known in the industry. Such disc drives record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator housing opposite to the coil, the actuator housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator housing, with the attached head suspensions and head assemblies, in accordance with the well-known Lorentz relationship. As the actuator housing rotates, the heads are moved radially across the data tracks along an arcuate path.

The head suspensions mentioned above are typically formed from thin stainless steel foil. In order to provide a robust connection between the head suspension and the actuator head mounting arms, the attachment end of the head suspension is typically welded to a relatively thick mounting plate which includes features intended to cooperate with mating features on the actuator head mounting arms to attach the head suspensions to the actuator.

By far the most common head suspension mounting method in current use is swage mounting. Swage mounted head suspensions include mounting plates that are formed with a cylindrical swage boss. Typically, the entire array of head/suspension assemblies is placed in cooperative arrangement with the actuator head mounting arms, with the swage bosses of the head suspension mounting plates inserted into openings in the actuator head mounting arms. A swaging tool, consisting of a ball feature having a diameter slightly larger than the inner diameter of the swage bosses, is then passed through the entire vertically aligned stack of swage bosses, expanding the swage bosses into firm contact with the inner diameters of the openings in the actuator head mounting arms. Thus, swage mounting of the head/suspension assemblies is simple and economical for use in high volume manufacturing environments.

Swage mounting of head suspensions does, however, produce potential problems. Firstly, the plastic deformation of the swage bosses during the swaging process induces large mechanical stresses in the material of the mounting plates, and these mechanical stresses can lead to deformation of the planar portion of the mounting plates to which the thin head suspensions are welded. Such deformation can lead to uncontrolled variation in the pitch and roll static attitudes of the entire head suspension/head assembly, adversely affecting the data recording/recovery performance of the entire disc drive.

Secondly, since the swage mounting plates must be located on the upper and lower surfaces of the actuator head mounting arms, and since certain minimal vertical dimensions of the various components must be maintained to provide the necessary mounting strength, swage mounting dictates that the vertical spacing between the elements of the head/disc stack has a finite minimum. In order to provide the maximum amount of storage capacity in a disc drive, designers seek to incorporate the greatest number of heads and discs possible within industry-defined physical form factors, or, alternatively, to develop ever smaller form factors. Thus, swage mounting imposes limits on the number of heads and disc that can be fitted into a defined physical package, and may impose limits on the total storage capacity of the disc drive.

Finally, swage mounting, by definition mechanically deforms the associated components when it is performed. If, after assembly, a faulty component is discovered, it is first difficult to disassemble a swage mounted head suspension assembly without damaging other "good" components. Additionally, reinsertion of a replacement swage mounted head suspension into a head mounting arm that has already been stressed by a previous swaging operation may result in less than optimal mounting force, leading to undesirable variation in the finished product.

For these and other reasons to be noted below, a need clearly exists for an alternative to swage mounting of the head suspension assemblies in a disc drive.

SUMMARY OF THE INVENTION

The present invention is an improved mounting system for attaching the head suspensions to the actuator mounting arms of a disc drive actuator. The mounting system of the invention includes novel features on both the head suspension mounting plates and on the actuator head mounting arms that facilitate snap-fitting or press-fitting of the mating components, as well as features that ensure accurate alignment of the mounted head suspensions in the major orthogonal axes. Several embodiments of the invention are disclosed.

It is an object of the invention to provide a mounting system for attaching head suspensions to actuator mounting arms in a disc drive.

It is another object of the invention to provide a head suspension mounting system that incorporates snap-fitting or press-fitting, and thus facilitates rework.

It is another object of the invention to provide a head suspension mounting system that includes features for orthogonally aligning the mounted head suspensions.

It is another object of the invention to provide a head suspension mounting system that minimizes the vertical, or Z-axis, height while maintaining adequate mechanical strength.

It is another object of the invention to provide a head suspension mounting system that is simple and economical to implement in a high volume manufacturing environment.

The manner in which the present invention achieves these objects, as well as other features, benefits and advantages of the invention, can best be understood by a review of the following Detailed Description of the Invention, when read in conjunction with an examination of the accompanying drawings.

DETAILED DESCRIPTION OF THE INVENTION

Figure 1:
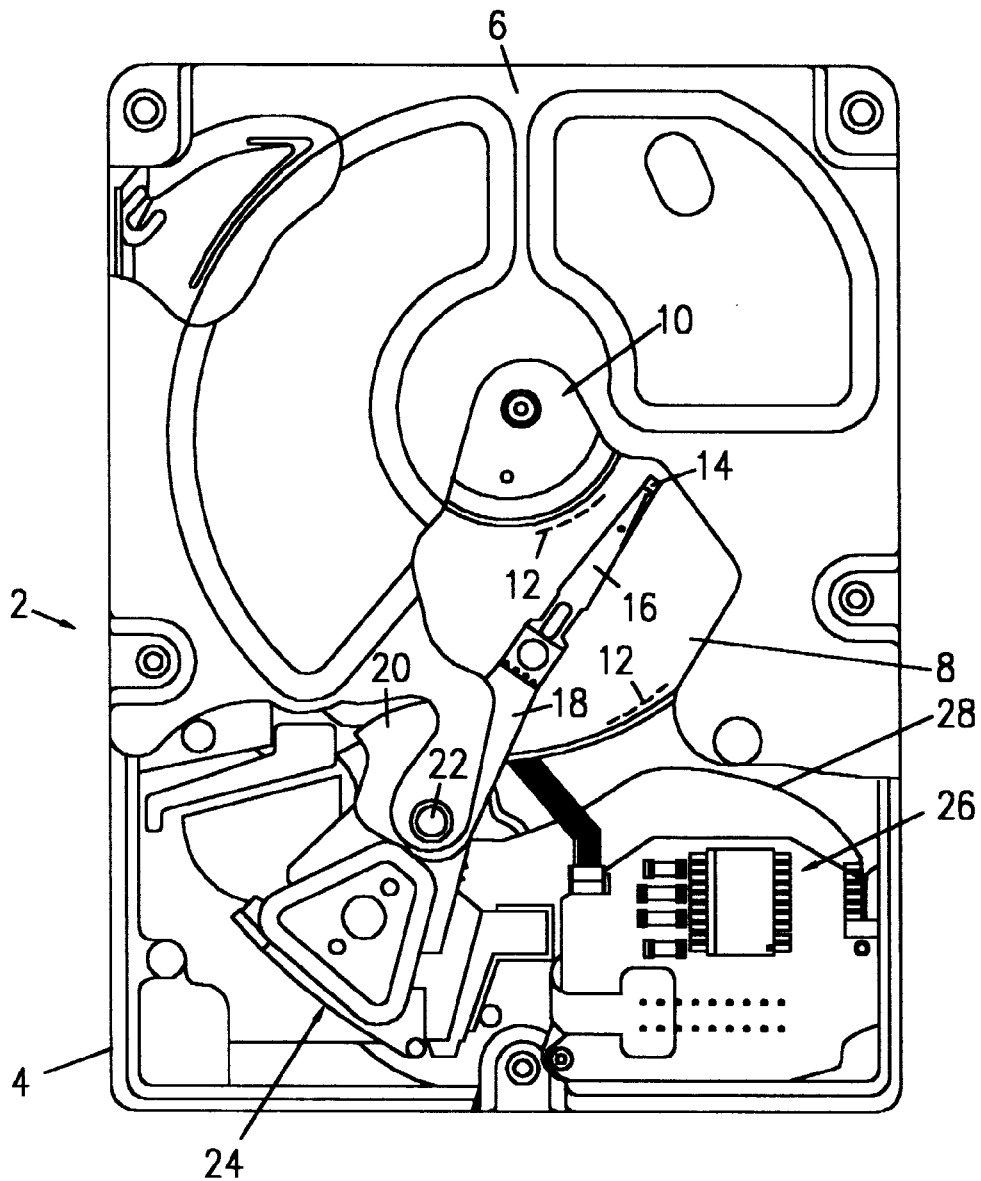
FIG. 1 is a plan view of a typical prior art disc drive in which the present invention is particularly useful.

Turning now to the drawings and specifically to FIG. 1, shown is a typical disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing enclosing delicate internal components and isolating these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted, via an array of ball bearing assemblies (not designated), for rotation about a pivot shaft 22.

Power to drive the actuator bearing housing 20 in its rotation about the pivot shaft 22 is provided by a voice coil motor (VCM) shown generally at 24. Electronic circuitry (partially shown at 26, generally, and partially carried on a printed circuit board (not shown)) to control all aspects of the operation of the disc drive 2 is provided, with control signals to drive the VCM 24 as well as data signals to and from the heads 14, carried between the electronic circuitry and the moving actuator assembly via a flexible printed circuit cable (PCC) 28.

Figure 2:
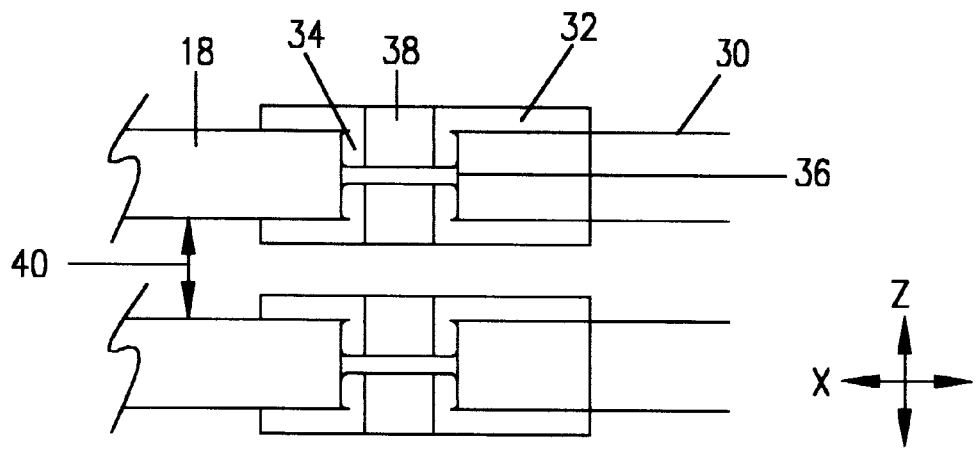
FIG. 2 is a simplified detail sectional elevation view of a typical prior art swage mounting system for head suspensions.

Turning now to FIG. 2, shown is a sectional elevation view of a typical prior art swage mounting system for head suspension assemblies. In the figure it can be seen that the head suspension (16 in FIG. 1) includes a spring member 30 and a relatively robust mounting plate 32 both commonly formed of stainless steel, and that the mounting plate 32 further includes a swage boss 34 which is inserted into an opening 36 in the actuator head mounting arm 18. The figure also shows that a pair of mounting plates 32 is associated with each actuator head mounting arm 18, with one of the swage bosses 34 inserted into the hole 36 on the top of the actuator head mounting arm 18, and the other inserted from the bottom. The actuator body (20 in FIG. 1) and, therefore, the actuator head mounting arms 18 are commonly formed of aluminum or magnesium to minimize moving mass.

The swage boss 34 can also be seen to include a central opening 38. After the base plates 32 of the head suspension assemblies have been positioned relative to the actuator head mounting arms 18 as shown in FIG. 2, a swaging tool (not shown) is passed through the central openings 38 in the swage bosses 34. The swaging tool includes a ball member that is slightly larger than the diameter of the central opening 38 in the swage bosses 34, and thus will cause plastic deformation of the swage bosses 34, expanding them into intimate contact with the inner diameter of the openings 36 in the actuator head mounting arms 18, all in a manner well known in the industry.

While the prior art swage mounting system just described is commonly used in the industry, it does have several drawbacks. Firstly, since the plate portion of the mounting plates 32 must lie in contact with the upper and lower surfaces of the actuator head mounting arms 18, the necessary thickness of the mounting plates 32 is a limiting factor on the spacing of adjacent head mounting arms 18, which leads to an attendant limitation on the spacing between adjacent heads and discs, and thus to limitations on the overall data storage capacity of a disc drive of a particular form factor, or, alternatively, serves as a limit on the vertical dimension of a desired new form factor.

Secondly, since the actuator head mounting arms 18 are typically formed as integral portions of a one-piece actuator body (20 in FIG. 1), the vertical spacing 40 between adjacent actuator head mounting arms 18 must provide not only for the thickness of the mounting plates 32 but for the vertical dimension of the swage bosses 34 as they are passed between adjacent actuator head mounting arms 18 and brought into alignment with the holes 36 in the actuator head mounting arms 18.

A third drawback of the prior art swage mounting system of FIG. 2 is that the swaging operation produces different mechanical stresses on head suspension assemblies on the upper and lower surfaces of the actuator head mounting arms 18. That is, as the swaging tool is passed through all of the swaging bosses 34 in the entire actuator assembly, in, for instance, the downward direction, the majority of the mechanical stresses applied by the swaging operation place the swage bosses 34 of assemblies on the upper surfaces of the head mounting arms 18 in tension, while the swage bosses 34 of assemblies on the lower surfaces are placed in compression.

This inequality in applied mechanical stresses can lead to unequal distortion of the base plates 32 on upper and lower surfaces of the actuator head mounting arms 18, and associated uncontrolled variations in static roll and pitch attitudes applied to the head suspensions, which can in turn lead to undesirable variation in the forces applied to the heads carried on the head suspensions.

The present invention overcomes all of these disadvantages.

FIG. 2 also includes references to define two of the major orthogonal axes that will be referred to in the ensuing discussion. In the figure, it can be seen that the X-axis corresponds to the longitudinal length of the actuator head mounting arm 18, as well as the longitudinal axis of the head suspension, while the Z-axis is shown to be the vertical axis.

Figure 3:
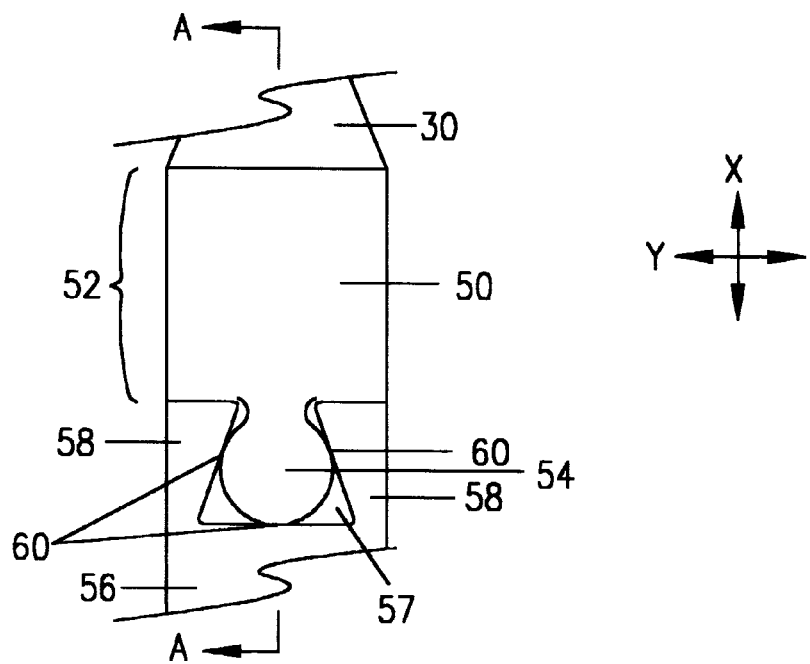
FIG. 3 is a simplified plan view of a first embodiment of the invention.

FIG. 3 shows a simplified plan view of a first embodiment of the present invention. The figure includes a mounting plate 50 to which the spring member 30 of the head suspension is welded, in that portion of the mounting plate 50 shown generally by numerical reference 52. The mounting plate 50 also includes an arm mounting feature 54 which is substantially circular in plan. The invention presently contemplates that the mounting plate 50 would be formed of stainless steel, however, other suitable materials could be utilized without exceeding the envisioned scope of the invention.

The actuator head mounting arm 56 includes a truncated triangular opening 57 which forms a pair of contact fingers 58. The circular arm mounting feature 54 and opening 57 are dimensioned such that the mounting plate 50 must be press-fitted into the opening 57, resulting in contact at three points 60 about the diameter of the arm mounting feature 54 and contact at flat surfaces (not numerically designated) at the distal ends of the contact fingers 58. As mentioned above, the actuator head mounting arm 56 would typically be formed of aluminum or magnesium, but the scope of the invention is envisioned to encompass the use of other suitable materials.

The figure also includes a reference that reiterates the X-axis as extending along the length of the actuator head mounting arm 56, and defines the Y-axis as the lateral axis corresponding to the width of the actuator head mounting arm 56. One of skill in the art will appreciate that the head suspension mounting system shown will act effectively to prevent relative motion between the head suspension and the actuator head mounting arm in both the X- and Y-axes, as well as preventing relative rotation of these elements about a pivot axis parallel to the Z-axis.

Figure 4:
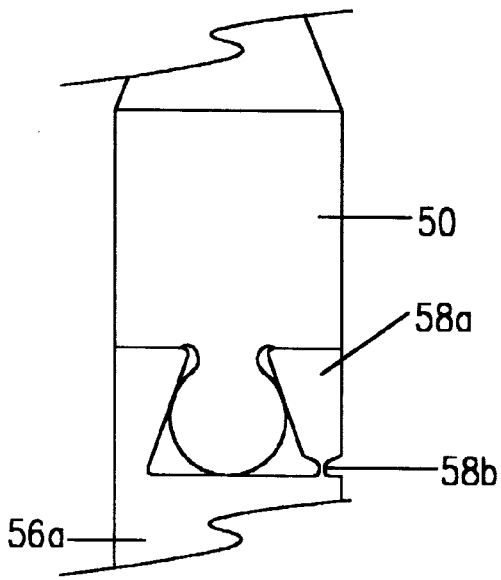
FIG. 4 is a simplified plan view showing a modification to the embodiment of FIG. 3.

FIG. 4 is a plan view of a variation of the embodiment of FIG. 3. In FIG. 4, the mounting plate 50 has the same form and serves the same functions as described above, and the actuator head mounting arm 56a has been modified by narrowing the base of one of the contact fingers 58a to provide a spring element 58b. The inclusion of the spring element 58b acts to reduce the spring rate of the contact finger 58a, and thus can be used as a designer option to control the mounting force applied by the actuator head mounting arm 56a to the mounting plate 50. Such control may be desirable to prevent the application of excessive stress on system elements which could lead to the previously mentioned variations in static roll and pitch attitudes in the associated head suspension assembly.

Figure 5:
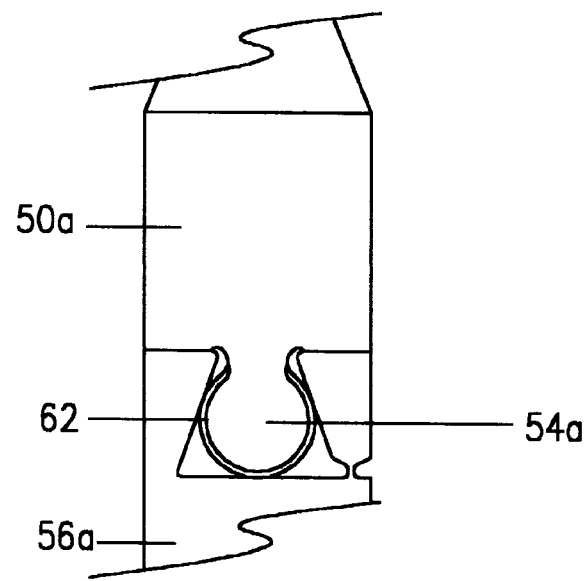
FIG. 5 is a simplified plan view showing a modification to the embodiment of FIG. 4.

FIG. 5 is a plan view of a second variation of the embodiment of FIG. 3, and is intended to show another apparatus for reducing localized mechanical stresses in the system components. In FIG. 5, the actuator head mounting arm 56a is of the same form and serves the same functions described above in the discussion of FIG. 4, but the actuator head mounting arm could also be the same as was described in relationship to FIG. 3.

The mounting plate 50a of FIG. 5 has been modified to allow the inclusion of a polymeric member 62 between the modified arm mounting feature 54a of the mounting plate 50a and the associated contact features of the actuator head mounting arm 56a. When the elements shown in the figure are press-fitted together, the polymeric member 62 will deform more readily than the materials of the mounting plate 50a and actuator head mounting arm 56a, thus preventing the concentration of mechanical stresses in these components.

Figure 6:
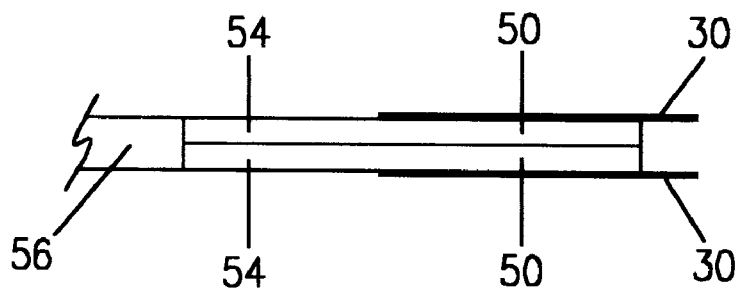
FIG. 6 is a simplified sectional elevation view, taken along line A—A of FIG. 3, showing one advantage of the present invention.

FIG. 6 is a simplified sectional elevation view, taken along line A—A of FIG. 3, of the head suspension mounting system embodiments described above in relation to FIGS. 3 through 5. FIG. 6 shows a pair of mounting plates 50 placed in a back-to-back relationship and mounted to an actuator head mounting arm 56. From the figure it is apparent that the combined Z-axis height of the two mounting plates 50 is equal to the Z-axis height of the actuator head mounting arm 18. This means that the Z-axis spacing of adjacent actuator head mounting arms 18 can be reduced in comparison to prior art swage mounting systems (see FIG. 2), or, alternatively, that the actuator head mounting arms 18 and mounting plates 50 could be made thicker and more robust. In fact, one of skill in the art will realize that the present invention allows much greater flexibility in selecting a desirable compromise between Z-axis spacing and component strength than was available with the prior art swage mounting system of FIG. 2.

One of skill in the art will also note that, should it be desirable to bring the spring members 30 of the head suspensions into closer relationship, that this can be readily accomplished with the head suspension mounting system of the present invention by simply stepping down and reducing the thickness of that portion of the mounting plate 50 (shown generally by numerical reference 52 in FIG. 3) to which the spring member 30 of the head suspension is welded. Indeed, the spring members 30 attached to one actuator head mounting arm 56 can be brought into direct contact by simply welding the spring members 30 to the opposite side of the mounting plates 50 to that shown in FIG. 6, should such be desirable.

From the foregoing discussion, it will be apparent to those of skill in the art that the embodiments of the present invention just described obviate the disadvantages described above of the prior art swage mounting system of FIG. 2. That is, the present invention allows for closer Z-axis spacing of major disc drive components—thus facilitating either greater overall storage capacity or smaller form factors—and serves to prevent the concentration of excessive mechanical stresses in head suspension components that could lead to unacceptable variations in the static roll and pitch attitudes in the head suspensions.

All of the embodiments described to this point rely on the frictional force provided by the press-fitting of the mounting elements to maintain the Z-axis position of the head assemblies in relationship to the actuator head mounting arm. While this is adequate for current generations of disc drive products, future generations are expected to adhere to increasingly large mechanical shock specifications which may dictate the inclusion of positive restraint in the Z-axis. An alternative embodiment of the invention, to be described below, provides such positive Z-axis positional control.

Figure 7:
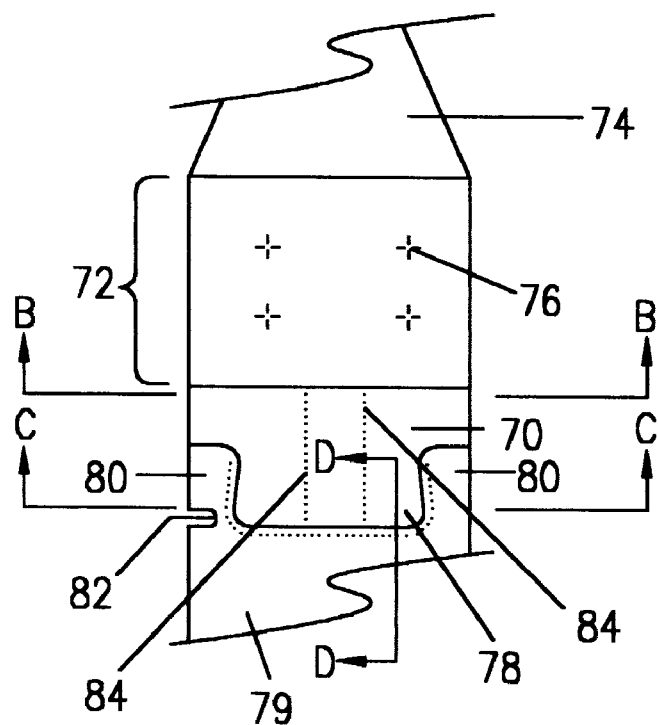
FIG. 7 is a plan view of a second embodiment of the present invention.

FIG. 7 shows a simplified plan view of an alternative embodiment of the invention. In FIG. 7, the mounting plate 70 includes a suspension attachment portion, shown generally at 72, to which the spring member 74 of the head suspension assembly is welded, typically in a symmetrical pattern of weld points, such as those designated with numerical reference 76. The arm mounting portion of the mounting plate 70 is a tab portion 78 which is narrower at its base than at its proximal end. A cooperatively shaped opening (not designated) in the actuator head mounting arm 79 acts in concert with the tab portion 78 of the mounting plate 70 to constrain the system components in the X- and Y-axes, as will be apparent to one of skill in the art.

FIG. 7 also shows that the actuator head mounting arm 79 includes a pair of contact fingers 80 created by the inclusion of the mounting opening in the actuator head mounting arm. One of the contact fingers 80 is shown with an optional notch 82 to provide control of the mounting force should such control be desired.

Other aspects of the embodiment of FIG. 7 can best be seen in FIGS. 8 through 13.

Figure 8:
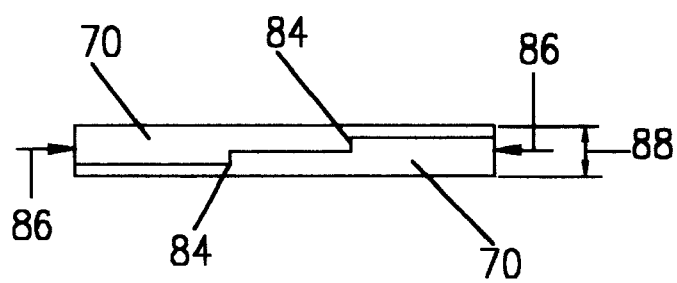
FIG. 8 is a sectional elevation view, taken along line B—B of FIG. 7, showing one aspect of the embodiment of FIG. 7.

FIG. 8 is a sectional elevation view, taken along line B—B of FIG. 7, and shows two mounting plates 70 in back-to-back contact. As can be seen in the Figure, the contact surfaces of the mounting plates 70 include a plurality of elevation step features 84 (also shown as dashed lines in FIG. 7) which interact to stabilize the relationship between the two mounting plates 70 when a mounting force is applied to the mounting plate 70 in the direction of arrows 86 by the contact fingers (80 in FIG. 7) of the actuator head mounting arm (79 in FIG. 7). While the Figure shows two step features 84, the scope of the present invention is envisioned to encompass the possibility of a single step, or a greater number of steps.

As was discussed in regard to the previously described embodiments of FIGS. 3 through 6, the invention envisions that the combined height 88 of the two mounting plates 70 will be substantially the same as the thickness of the actuator head mounting arm, providing the same benefits as described in the embodiments of FIGS. 3 through 6.

Figure 9:
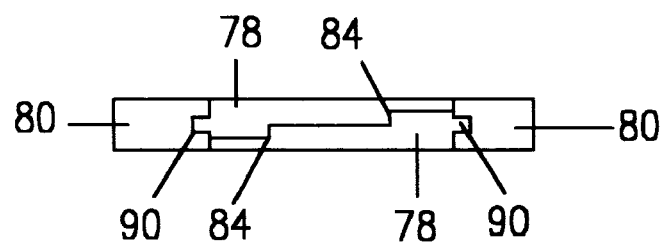
FIG. 9 is a sectional elevation view, taken along line C—C of FIG. 7, showing a second aspect of the embodiment of FIG. 7.

FIG. 9 is a sectional elevation view, taken along line C—C of FIG. 7, and shows another aspect of the embodiment of FIG. 7. FIG. 9 is a sectional through the tab portions 78 of the mounting plates and shows that the step features 84 extend through the tab portions 78 of the mounting plates and act as described above in the description of FIG. 8.

FIG. 9 also shows the contact fingers 80 of the actuator head mounting arm and shows that the tab portions 78 of the mounting plates include Z-axis registration features 90 which interact with cooperative features (not designated) in the contact fingers 80 to positively establish the Z-axis position of the mounting plates relative to the actuator head mounting arm.

Figure 10:
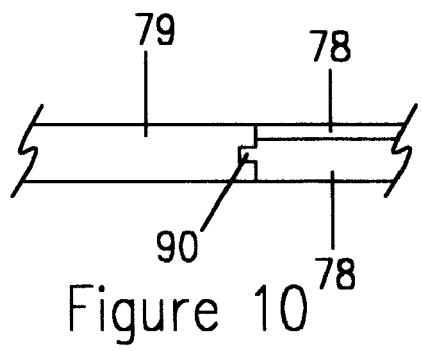
FIG. 10 is a sectional elevation view, taken along line D—D of FIG. 7, showing a third aspect of the embodiment of FIG. 7.

FIG. 10 is a sectional side elevation view, taken along line D—D of FIG. 7, and also shows that the proximal end of the tab portions 78 of the mounting plates also include the Z-axis registration features 90 which engage cooperative features (not designated) in the actuator head mounting arm 79 and also shown by dashed lines in FIG. 7.

Thus, once the pair of head mounting plates is longitudinally pressed into the opening in the actuator head mounting arm, the spring action of the contact fingers 80 acts to firmly engage the head mounting plates in the X-, Y-, Z- and rotational axes.

Figure 11:
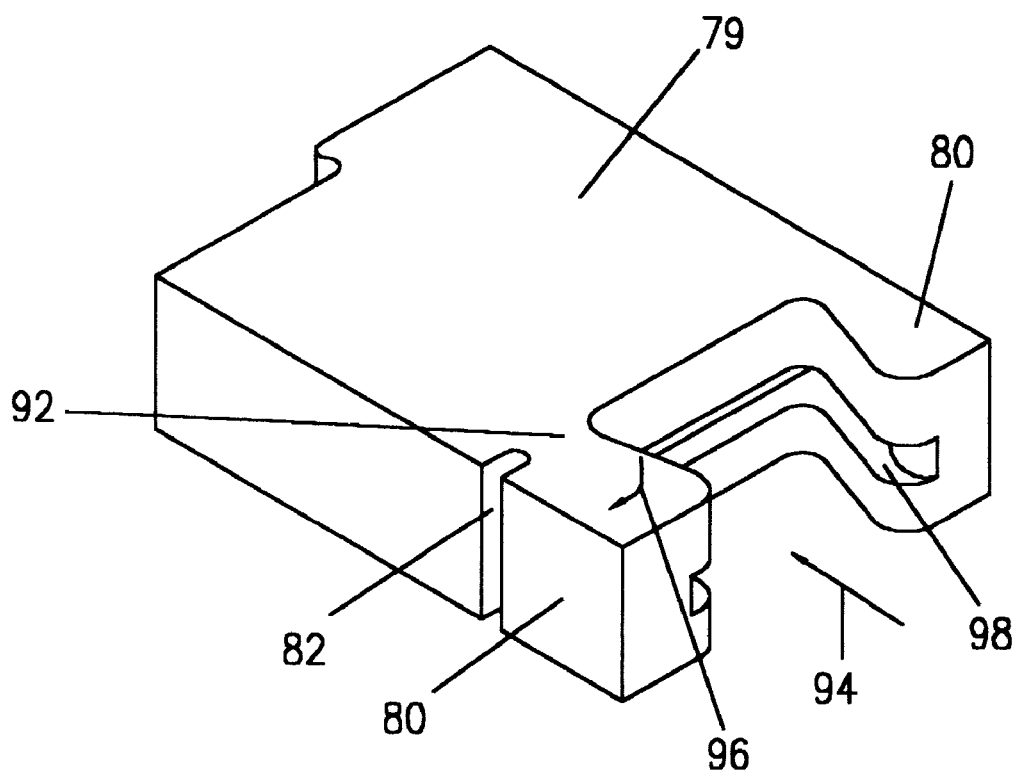
FIG. 11 is a perspective view of features on the actuator head mounting arm that are a part of the embodiment of FIG. 7.
Figure 12:
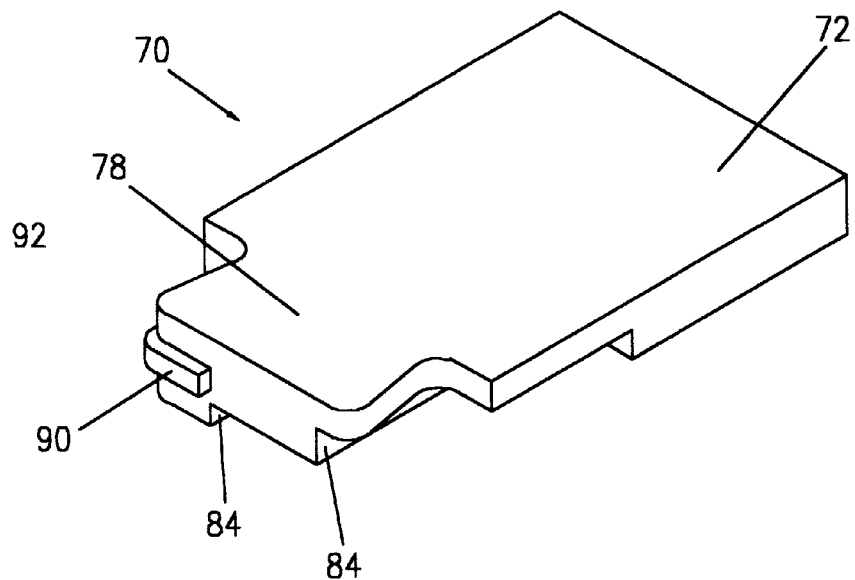
FIG. 12 is a perspective view of a mounting plate that makes up a part of the embodiment of FIG. 7.
Figure 13:
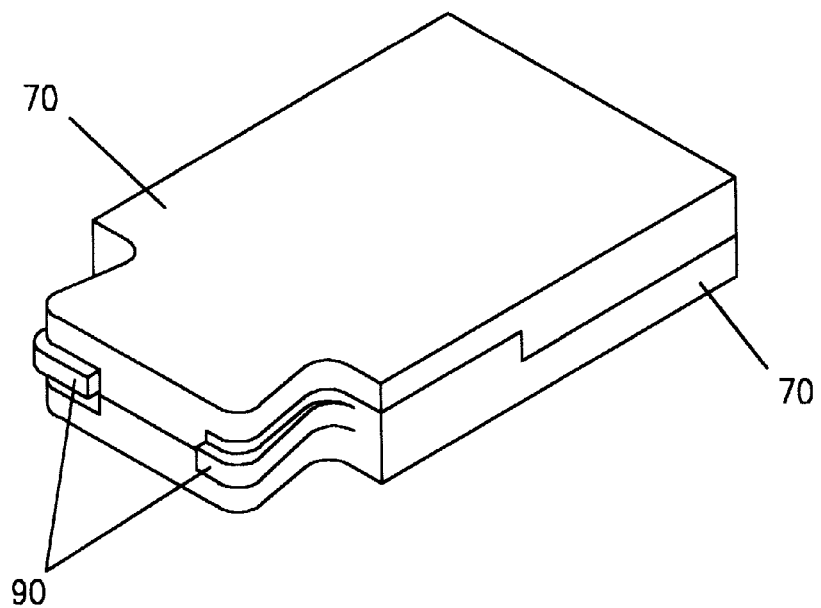
FIG. 13 is a perspective view showing two of the mounting plates of FIG. 12 in their assembled orientation.

The specific form of the components comprising the embodiment of FIG. 7 can perhaps best be seen in FIGS. 11 through 13.

FIG. 11 is a perspective view of the distal end of the actuator head mounting arm 79 and shows the contact fingers 80 which interact with the tab portion (78 in FIG. 7) to provide the mounting force of the head suspension mounting system of the present invention. FIG. 11 also shows the optional notch 82 associated with one of the contact fingers 80 to provide a thinned spring region 92 should such controllability of the spring force be desired.

When a pair of contacting head mounting plates (70 in FIG. 7) are pressed into the opening in the distal end of the actuator head mounting arm 79, in the direction of arrow 94, the contact fingers 80 rotate outwardly, in the general direction indicated by arrow 96. When the paired mounting plates are totally seated within the opening in the distal end of the actuator head mounting arm 79, the contact fingers 80 return to their original position, locking the head mounting plates in position.

FIG. 11 also shows a notch feature 98 which will engage the Z-axis registration features (90 in FIGS. 9 and 10) to positively establish the Z-axis position of the head mounting plates.

FIG. 12 is a perspective view of the head mounting plate 70 which can be seen to include the suspension attachment portion 72 and the tab portion 78, the functions of which have been previously described. The figure also shows the step features 84 that define the varying thickness of the head mounting plate 70. The example head mounting plate 70 shown in FIG. 12 envisions that the thickness of the head mounting plate 70 in the region of the suspension attachment portion 72 is substantially one-half of the desired overall thickness of a mated pair of the mounting plates 70, and that the step features 84 extend only from the attachment end of the head mounting plates 70 to the suspension attachment portion 72. However, the step features 84 could also extend throughout the entire length of the paired mounting plates 70.

In FIG. 12, the Z-axis registration feature 90 can be seen to extend from the distal end of the tab portion around to the side of the tab portion 78.

FIG. 13 is a perspective view showing a pair of the mounting plates 70 arranged in back-to-back contact. It will be noted that the Z-axis registration features 90 of the head mounting plates are brought into a coplanar relationship for engagement with the notch feature (98 in FIG. 11) to lock the mounting plates together in the Z-axis, as well as to establish the Z-axis position of the mounting plates 70 relative to the actuator head mounting arm.

It will now be apparent to one of skill in the art that a sectional view of the mounting features of the embodiment of FIGS. 7 through 13 would be very similar to that shown in FIG. 6 for the embodiments of FIGS. 3 through 5, with the additional benefit of the Z-axis registration features discussed above.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiments, certain variations and modifications may be suggested to one of skill in the art upon reading this disclosure. Therefore, the scope of the present invention should be considered to be limited only by the following claims.

What is claimed is:

1. A mounting system for attaching a head suspension assembly to a head mounting arm of a disc drive actuator assembly, comprising:

a first mounting feature disposed at a distal end of the head mounting arm; and a second mounting feature disposed at a proximal end of the head suspension assembly;

wherein the first mounting feature comprises a substantially triangular notch between a pair of laterally opposed fingers, the notch being laterally narrower at a first longitudinal end proximate the head suspension assembly than at a second longitudinal end further from the head suspension assembly than the first end; and wherein the second mounting feature comprises a cooperating tab; and wherein the head suspension assembly is mounted to the head mounting arm by inserting the tab into the notch, the fingers exerting a retaining force to maintain the head suspension assembly rigidly affixed to the head mounting arm;

the mounting system being further defined as having an X-axis extending substantially in parallel with a length of the head mounting arm and the head suspension assembly;

a Y-axis extending substantially in parallel with a width of the head mounting arm and the head suspension assembly; and a Z-axis extending substantially normal to the plane of the X-axis and Y-axis;

the first and second mounting features also including orthogonal alignment features for positively aligning the head suspension assembly with the head mounting arm along the X-axis and Y-axis, and for preventing rotation of the head suspension assembly relative to the mounting arm about an axis substantially parallel with the Z-axis.

2. The mounting system as claimed in claim 1, wherein the first and second mounting features further include Z-axis registration features that positively establish and maintain a desired positional relationship between the head suspension assembly and the head mounting arm along the Z-axis.

3. A mounting system for attaching a head suspension assembly to a head mounting arm of a disc drive actuator assembly, comprising:

a first mounting feature disposed at a distal end of the head mounting arm;

a second mounting feature disposed at a proximal end of the head suspension assembly, wherein a selected one of the first and second mounting features comprises a substantially triangular notch between a pair of laterally opposed fingers, wherein the remaining one of the first and second mounting features comprises a cooperating tab, and wherein the head suspension assembly is mounted to the head mounting arm by inserting the tab into the notch, the fingers exerting a retaining force to maintain the head suspension assembly rigidly affixed to the head mounting arm; and the first and second mounting features further including Z-axis registration features that positively establish and maintain a desired Z-axis positional relationship between the head suspension assembly and the head mounting arm.

* * * * *